United States Patent
Rhoades

(10) Patent No.: US 10,864,778 B2
(45) Date of Patent: Dec. 15, 2020

(54) VEHICLE TYRE INSPECTION

(71) Applicant: PRE-CHASM RESEARCH LTD, Cheshire (GB)

(72) Inventor: Anthony David George Rhoades, Hale (GB)

(73) Assignee: Pre-Chasm Research Ltd., Hale (GB)

( * ) Notice: Subject to any disclaimer, the term of this patent is extended or adjusted under 35 U.S.C. 154(b) by 192 days.

(21) Appl. No.: 15/519,901

(22) PCT Filed: Nov. 20, 2015

(86) PCT No.: PCT/GB2015/053542
§ 371 (c)(1),
(2) Date: Apr. 18, 2017

(87) PCT Pub. No.: WO2016/063093
PCT Pub. Date: Apr. 28, 2016

(65) Prior Publication Data
US 2017/0246916 A1    Aug. 31, 2017

(30) Foreign Application Priority Data
Oct. 20, 2014 (GB) .................................. 1418638.1

(51) Int. Cl.
*B60C 11/24* (2006.01)
*G01M 17/02* (2006.01)
(Continued)

(52) U.S. Cl.
CPC ......... *B60C 11/246* (2013.01); *G01M 17/025* (2013.01); *G01M 17/027* (2013.01);
(Continued)

(58) Field of Classification Search
None
See application file for complete search history.

(56) References Cited

U.S. PATENT DOCUMENTS 5,562,787 A * 10/1996 Koch .................. B60C 23/0493
                                                    156/64
5,987,978 A * 11/1999 Whitehead ............. G01B 11/22
                                                    73/146
(Continued)

FOREIGN PATENT DOCUMENTS

| DE | 19744076 | 4/1999 |
| DE | 102012103420 | 10/2013 |

(Continued)

OTHER PUBLICATIONS

PCT International Search Report; PCT/GB15/053542 dated Feb. 2, 2016.
(Continued)

*Primary Examiner* — Paul M. West
*Assistant Examiner* — Mark A Shabman
(74) *Attorney, Agent, or Firm* — Hartman Global IP Law; Gary M. Hartman; Domenica N.S. Hartman

(57) ABSTRACT

A tyre condition monitoring system comprising a sensing unit adapted for approximation to a tyre to take a measurement of, or at least from which can be derived, tread depth, the sensing unit being adapted for deployment by manual approximation to a tyre and to store and/or transmit measurement data from one or more or all of a set of tyres on a vehicle as well as for mechanical approximation to a tyre for continuing and/or programmed measurement.

19 Claims, 2 Drawing Sheets

(51) Int. Cl.
*G01B 7/26* (2006.01)
*G01B 11/22* (2006.01)

(52) U.S. Cl.
CPC ............ *B60C 11/24* (2013.01); *B60C 11/243* (2013.01); *G01B 7/26* (2013.01); *G01B 11/22* (2013.01); *G01M 17/02* (2013.01)

(56) References Cited

U.S. PATENT DOCUMENTS

| | | | | |
|---|---|---|---|---|
| 6,069,966 | A * | 5/2000 | Jones | G01B 11/22 382/100 |
| 6,789,416 | B1 * | 9/2004 | Tracy | G01B 11/22 73/146 |
| 7,269,997 | B2 * | 9/2007 | Dale, Jr. | G01B 11/22 73/146 |
| 8,079,254 | B2 * | 12/2011 | Braghiroli | G01M 17/027 73/146 |
| 2009/0000370 | A1 * | 1/2009 | Lionetti | G01B 7/26 73/146 |
| 2010/0147063 | A1 * | 6/2010 | Suzuki | B60C 23/0408 73/146.5 |
| 2012/0008148 | A1 * | 1/2012 | Pryce | G01B 11/245 356/601 |
| 2012/0067115 | A1 * | 3/2012 | Pingel | G01B 11/22 73/146 |
| 2012/0268263 | A1 * | 10/2012 | Lee | B60C 23/0472 340/442 |
| 2013/0185005 | A1 * | 7/2013 | Petrucelli | G01M 17/027 702/50 |
| 2014/0104398 | A1 * | 4/2014 | Zoken | G01M 17/027 348/50 |
| 2015/0035971 | A1 * | 2/2015 | Bogenschuetz | B60C 11/24 348/128 |

FOREIGN PATENT DOCUMENTS

| | | |
|---|---|---|
| EP | 2009389 | 12/2008 |
| KR | 20130072774 | 2/2013 |
| WO | 9610727 | 4/1996 |
| WO | 2008061770 | 5/2008 |
| WO | 2010115390 | 10/2010 |

OTHER PUBLICATIONS

United Kingdom Search and Examination Report dated Dec. 23, 2014.

* cited by examiner

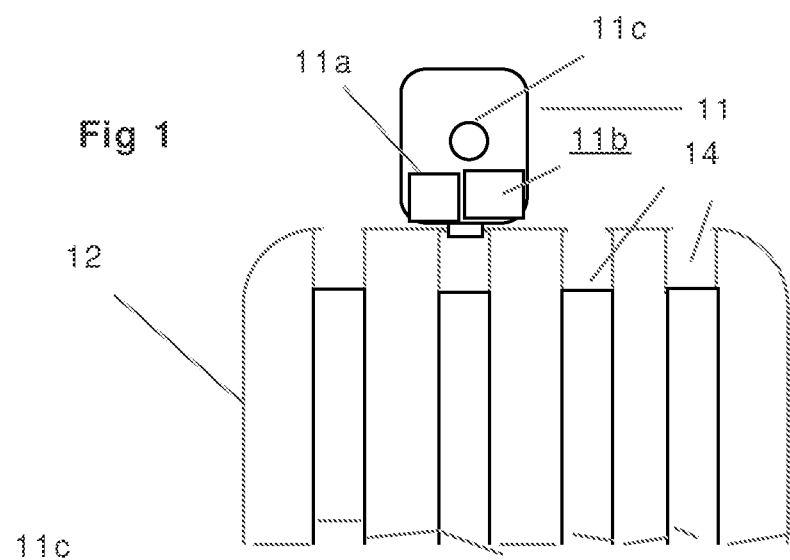
Fig 1
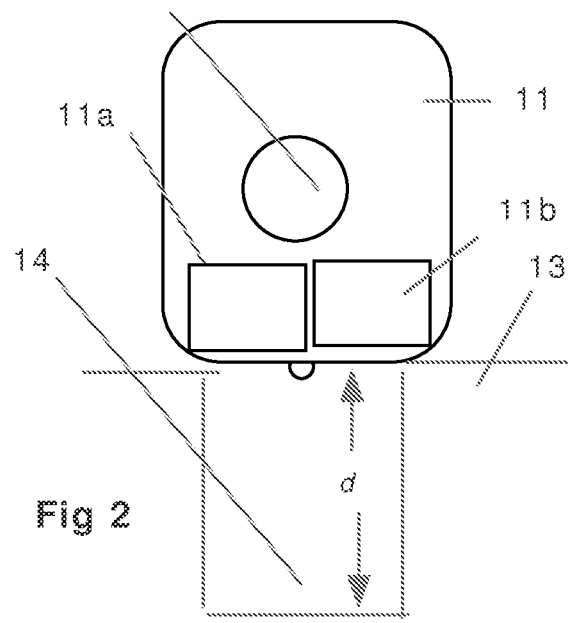
Fig 2
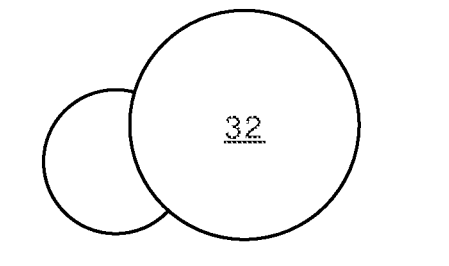
Fig 3
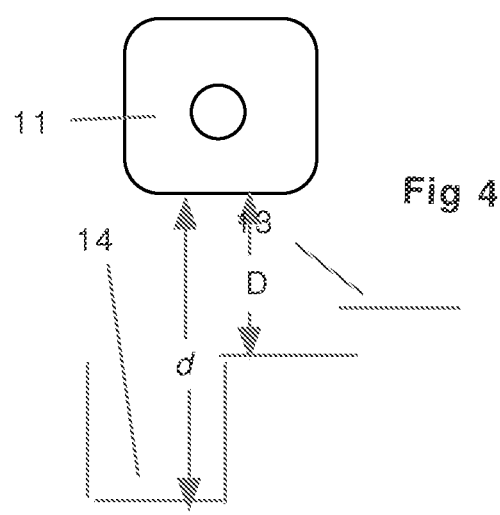
Fig 4
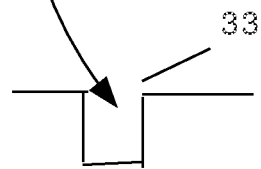

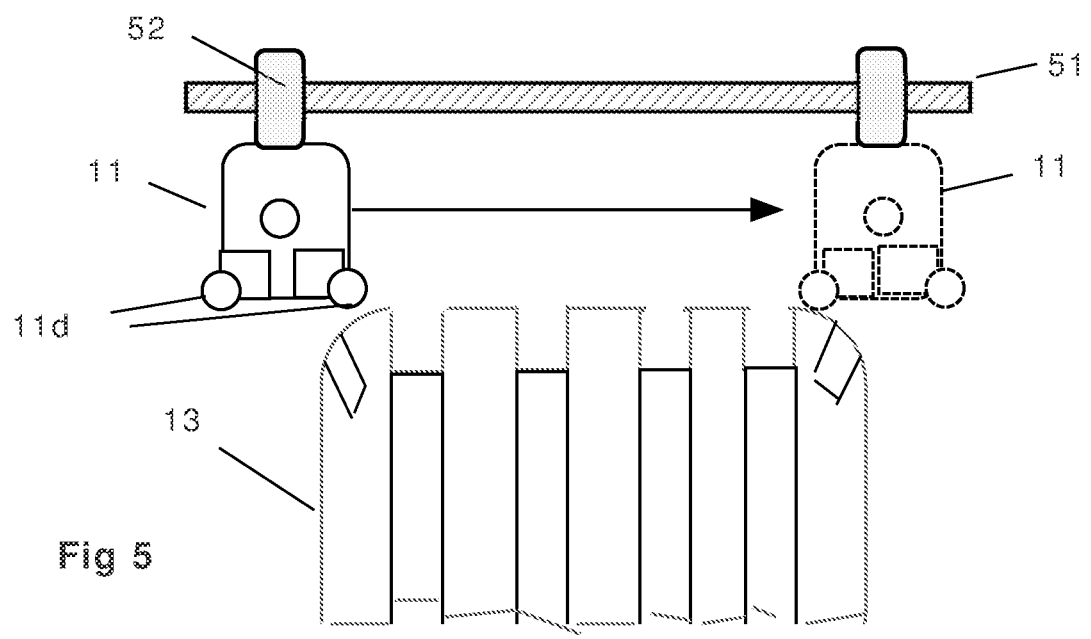
Fig 5
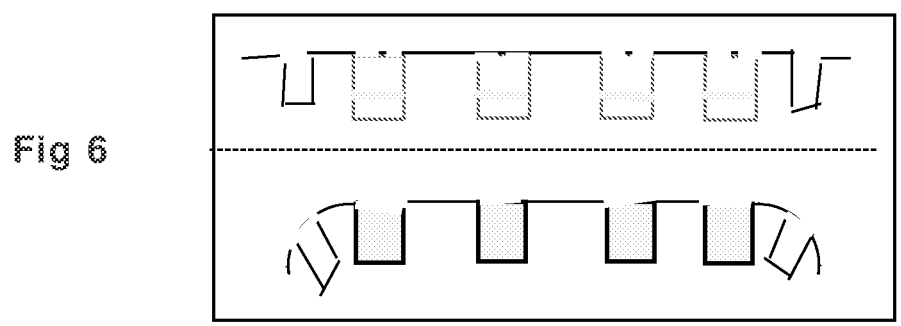
Fig 6
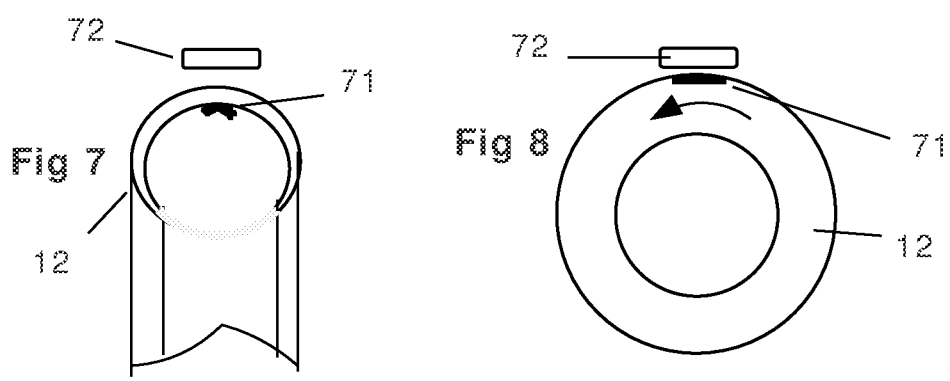
Fig 7
Fig 8
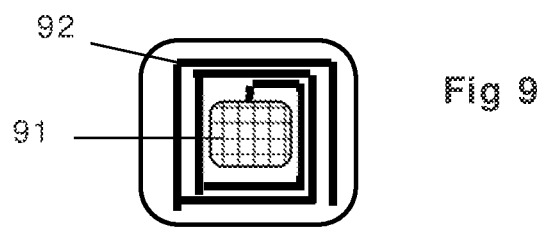
Fig 9

VEHICLE TYRE INSPECTION

This invention relates to vehicle tyre inspection.

Vehicle tyres are subject to wear and damage. Worn or damaged tyres can be dangerous on road vehicles, and tyres are checked in routine inspection such as the British Government's Ministry of Transport (MOT) annual test. Tyres that do not have a prescribed minimum tread depth will not pass the test. The annual check, however, means that the tyre could have been worn, and dangerous, for some months before.

It is, of course, the responsibility of the vehicle owner to maintain it, and particularly its tyres, in safe and roadworthy condition. Tyre condition, and, often, tyre inflation, are often overlooked, or not checked regularly enough. Worn or damaged tyres are implicated in around 50% of serious or fatal road injuries.

Tread depth gauges are readily available. They comprise a probe sliding in a cylinder. The probe is inserted into a tyre groove and the cylinder advanced till its end is in contact with the tread. The tread depth is read off a scale, which in some instances is on the other end of the probe projecting from the other end of the cylinder. Such a gauge is best used when the vehicle is on a ramp or when the wheel is off the vehicle, so that the entire width and circumference can be inspected—tyres are often subject to uneven wear through faulty tracking or wheel alignment. Using such gauges when the vehicle is on the road most often means kneeling, squatting or even lying on the ground, and even so only a small part of most tyres will be available for inspection.

Other proposals have been made for tyre inspection, some involving making an image from structured light illumination that can be analysed to give tyre surface contour information from which tread depth can be calculated. The image can be taken across the width of the tyre to detect uneven wear. One such proposal has the imaging arrangement let into a road surface.

WO96/10727 discloses various methods for measuring tread depth, including measuring time of flight of an electromagnetic signal, e.g. a laser light or an ultrasonic signal, from the tyre surface to the groove base and back. Such a time of flight is very small, but measurable electronically. Measurement, and, indeed, observation of general tread condition, is effected in one embodiment with the wheel mounted on rollers so that it can be rotated for the whole tread surface to be scanned, in another embodiment by virtue of a vehicle being driven over a sensing arrangement.

WO2008/061770 discloses associating a tread depth measuring device, which might be a time of flight device, with each tyre on a vehicle.

Neither of these suggestions appears to have been backed by sufficient technology to result in a commercially viable product. Neither patent application proceeded to a granted patent.

There is in fact no available provision whereby tyre condition inspection, and in particular tread depth measurement, can be carried out easily and objectively that would be available to vehicle owners for regular monitoring and to law enforcement agencies for spot checks on parked vehicles. There is, moreover, no system available for automatic tread depth monitoring as practical 'on-vehicle' equipment.

While the requirements for all these disparate requirements would appear to dictate different measurement methods and different equipment, it would be best if one measurement method and one piece of measuring equipment could be adapted for all the requirements, as this would give at least some consistency. Thus if an on board monitoring arrangement made the same type of measurement, to the same degree of accuracy, as a law enforcement agency, the vehicle owner could be confident that his tyres would pass random inspection.

There is, of course, more to tyre inspection than the mere measurement of tread depth, though at the time of writing, this is effectively the sole criterion of legality in most jurisdictions. Much can be learned from tyre condition about the set-up of a vehicle's suspension, and about the way the vehicle is driven. Wear at one edge or the other may indicate faulty toe-in or other suspension fault, undue wear can indicate bad driving techniques or inadequate tyre pressure maintenance, all of which, spotted early, can be dealt with, increasing tyre life and reducing driving risk.

The present invention provides a tyre inspection system that can be realised in different formats for on-vehicle monitoring and for ad hoc inspection, and that is, moreover adapted for recording and transmitting tyre and associated data as and when required for law enforcement agencies, insurance companies, fleet operators and other interested entities.

The invention comprises a tyre condition monitoring system comprising a sensing unit adapted for approximation to a tyre to take a measurement of, or at least from which can be derived, tread depth, the sensing unit being adapted for deployment by manual approximation to a tyre and to store and/or transmit measurement data from one or more or all of a set of tyres on a vehicle, as well as for mechanical approximation to a tyre for continuing and/or programmed measurement.

The system may measure or derive tread depth from a time-of-flight measurement of an electromagnetic signal injected into a tyre groove, but may also image the tread in such manner as may be amenable to image processing to facilitate condition assessment A time of flight system may comprise a signal injector and a reflected signal receiver.

The signal injector may comprise a laser, which may inject visible light, infra-red or ultra-violet light, and the receiver may be a photocell sensitive to the laser light.

The injector and receiver may be comprised in a signal head adapted to be approximated to a tyre, to be placed, for example, a known distance from the tyre tread surface or in contact with the tread surface and aimed at the base of a groove of the tread.

Or a sensing unit may be locatable at an arbitrary distance from a tread surface whereby the receiver will receive reflections from the tread surface and the groove base.

In any event, the sensing unit may be moved from groove to groove to build up a profile of tread depth across the tyre.

For a simple, manual, embodiment, the sensing unit may be a small hand held unit that can be kept in a docking station in a vehicle. It may communicate with a smartphone app, or software built into a vehicle's management system, which may give directions for periodical tyre inspection and step a user through an inspection procedure.

When a tyre assessment is required, the unit is removed from the docking station, which action may initiate a measurement sequence specifying which tyre to inspect first and how to move the unit over the tread. Tread details may be held in software, which can ascertain that all tread grooves on a tyre have been measured. Measurements can be stored in memory in the unit and downloaded to a processor when the unit is returned to the docking station.

For law enforcement agency use, the sensing unit may be accommodated in similar fashion, the docking station being in a portable case, and deployable on a wand.

By approximation to a tyre may be meant either that the unit is placed in contact with the tread surface or that it is held at a small distance from the tread surface.

A measurement sequence—which may comprise ordered tasks, displayed on a screen and/or orally through an earpiece or speaker, such as 'Measure tyre 1 front nearside' and so forth—can guide a user through all the correct procedures. Manual deployment, however, is open to operator error, which may be accidental or intentional. Automated monitoring can eliminate operator error.

A robot arm may traverse the sensing unit. For a multi-wheeled vehicle, there may be one robot arm and sensing unit for each wheel. The sensing unit may incorporate a signal time-of-flight measurement or indeed any other kind of measurement that may be appropriate. A measurement sequence may be initiated manually or automatically, for example, whenever a vehicle's engine is started or stopped or at fixed time and/or mileage intervals.

Measurement may be made when the vehicle is stationary, when only one scan across each tyre will be made, but, of course, regular measurement will eventually cover the whole circumference. However, a full circumferential check may be made by rolling the vehicle a full tyre circumference, which, again, may be done manually or with the vehicle under software control.

Scanning may be automatically started when the traversing sensing unit encounters one edge of the tyre and automatically stopped when the scanning head encounters the other edge of the tyre. The sensing unit may encounter a tyre edge by a proximity switch or a mechanical switch actuated by a skid or a roller.

The sensing unit may, during its traverse of a tyre tread, cover not only the flat part of the tread but also the curved edges, and its optical axis may at all times be perpendicular to the tyre surface. A graphical representation of a traverse may be presented as depicting the actual surface contour or as a straight line projection.

Through a smartphone app, or through engine management system software and on-board communication system, the sensing unit may communicate via the internet or a cellular network with a tyre management or fleet management operation, an insurance company or a tyre parameter monitoring operation e.g. of a government enforcement agency. When tyres are due for replacement, the software may initiate an internet search and present a selection of local or national tyre stockists indicating price and availability, and go on to arrange a purchase and/or an appointment for replacement.

Tyres may be transferred from position to position on a vehicle to even out wear. If a running log is kept of tyre condition, such transfer would need to be taken into account. However, it is possible to assign an ID to a tyre, one method being to attach or embed an RFID chip during tyre manufacture. For tyres that do not have such a chip, a low cost chip can be adhesively attached to the inner wall of the tyre underneath the tread, and read by an RFID reader located in the wheel arch close to the tyre, which energises the chip through its aerial to effect a readout. A pressure transducer can be similarly mounted on a plastic film with an aerial for activation, to give a constant pressure indication.

Tyre condition monitoring systems according to the invention will now be described with reference to the accompanying drawings, in which:

FIG. 1 is an edge-on view of a tyre with a first embodiment measurement system;

FIG. 2 is an enlarged view of part of FIG. 1;

FIG. 3 is a schematic diagram of a communications system;

FIG. 4 is a view like FIG. 2 of a second embodiment measurement system;

FIG. 5 is a diagrammatic illustration of a robot arm traversing arrangement scanning a tyre tread;

FIG. 6 is a graphical representation of a scan by the equipment of FIG. 5;

FIG. 7 is a diagrammatic representation of a near field communication device located in a tyre in cross section;

FIG. 8 is the side on view of FIG. 7, to a smaller scale; and

FIG. 9 is a diagrammatic illustration of a near field communicating pressure sensor.

The drawings illustrate a tyre tread condition monitoring system comprising a sensing unit 11 adapted for approximation to a tyre 12 to take a measurement of, or at least from which can be derived, tread depth, the sensing unit 11 being adapted for deployment by manual approximation to the tyre 12 and to store and/or transmit measurement data from one or more or all of a set of tyres on a vehicle as well as for mechanical approximation to a tyre 12 for continuing and/or programmed measurement.

The sensing unit 11 comprises a signal injector 11a and a reflected signal receiver 11b on a signal head 11.

The signal injector 11a comprises a laser, which injects visible light, infra-red or ultra-violet light, and the receiver 11b is a photocell sensitive to the laser light. A light meter can measure ambient light, which affects sensitivity, and make adjustments to the programming to compensate.

The injector 11a and receiver 11b are comprised in the sensing unit 11 which is adapted to be approximated to the tyre 12, to be placed in contact, FIGS. 1 and 2, with the tread surface 13 and aimed at the base 14 of a groove of the tyre 12. The injector 11a emits a pulse of light and the receiver 11b picks up its reflection from the base 14 of the groove and measures the time delay.

The minimum permitted tread depth for automobile tyres in the UK is 1.6 mm. The total distance traveled by the light, for a minimum depth groove, is 3.2 mm, the time taken from emission to pick up, taking the speed of light to be $3 \times 10^{12}$ mm/sec, then being $1.07 \times 10^{12}$ seconds.

In FIG. 4, the sensing unit is locatable at an arbitrary distance D from the tread surface 13 whereby the receiver will receive reflections from the tread surface 13 and the groove base 14. In this arrangement, the time between surface and groove reflections, for a minimum depth of 1.6 mm, will be $1.07 \times 10^{12}$ seconds.

The sensing unit 11 comprises a small, hand held unit, and communicates with a smartphone app, or software built into a vehicle's management system, which may give directions for periodical tyre inspection and step a user through an inspection procedure. This will generate measurements on all the vehicle's wheels and desirably at multiple places around and across the tread. Software will either determine that measurements are above or below the minimum depth, for a go-no go test, or will compute the actual depths for analysis, for example, by a tyre monitor function that will facilitate rate of wear indication and predict tyre replacement requirement.

FIG. 5 illustrates how the sensing unit 11 can be mounted on a robot arm 51, shown simply as a screw threaded rod engaging thread on a nut 52 on the head 11. Turning the rod traverses the signal head across the tyre. Rollers or skids 11d sense when the unit 11 encounters and leaves the tyre 12 to turn the signal on and off. Time of flight between signal injection and echo arrival is monitored continually as the nit traverses, and the result depicted graphically, as shown in FIG. 6. The upper graph in FIG. 6 shows the tread pattern projected onto a straight line, the lower graph shows the contour of the tread. While FIG. 5 shows only rectilinear motion of the unit 11 across the tyre, it is more desirable that the head 11 comes into contact with, and is perpendicular to the tyre surface, at the rounded edges of the tyre 12. To achieve this, in practice, some kind of articulation of the head 11 to the traverse mechanism would be required, which may be nothing more complex than a curved rail on which the unit 11 moves, driven from the arm 51 via an articulated joint.

Instead of a single traversing unit 11, a number of such units could be located in the wheel arch to measure across the tread. The units may be normally protected by cover means that can be opened for measurement.

While the sensing unit 11 of FIG. 1 may be used on wheels in a fixed sequence around the vehicle, as may be dictated by software, the robot arm units can operate all together, and the software will 'know' which wheel they are measuring.

However, it is a common practice to change a vehicle's wheels around to even out wear, and this can lead to confusion and readings being attributed to the wrong tyres.

It has been proposed to assign identities to individual tyres, and in particular by attached or embedded RFID chips. FIGS. 7 and 8 illustrate how such a chip 71 can be simply adhered to the inner wall of a tyre 12 to be read by an RFID reader 72 mounted in the wheel arch.

A pressure transducer 91, illustrated in FIG. 9, could likewise be adhered to the inner wall of the tyre 12 comprised in a wafer with an aerial 92, like an RFID chip, which could be read in like fashion by a reader powering up the transducer by induced current in the aerial 92, for a continuing tyre pressure monitor taking a reading every revolution.

Through the smartphone app, or through the management system software and on-board communication system, the sensing unit may communicate via the internet or a cellular network with a tyre management or fleet management operation, an insurance company or a tyre parameter monitoring operation e.g. of a government enforcement agency. FIG. 3 illustrates the sensing unit 11 communicating via a smartphone 31 which in turn communicates through a cellular network 32 with any desired recipient. The unit 11 can sit in a docking station 33 in the vehicle and be connected via on-board electronics to the internet or a cellular network and to the vehicle's diagnostic and vehicle management systems.

Instead of, or in addition to, the time of flight sensing, a digital camera can be incorporated into the unit 11, imaging the tread pattern in such a way as to enable image processing techniques such as edge detection to be used as a way of assessing tread condition.

The invention claimed is:

1. A tyre condition monitoring system comprising a sensing unit adapted for use with a tyre and placed a distance from a tread surface of the tyre to take a measurement of, or at least from which can be derived, depth of tread grooves(s) in the tread surface, the sensing unit being adapted for deployment by non-automated manual or mechanical placement at the distance from the tyre and to store and/or transmit measurement data from one or more of a set of tyres on a vehicle, wherein the sensing unit comprises a signal injector that emits signals to the tread surface and into the tread groove(s), a reflected signal receiver for receiving reflected signals resulting from the signals being reflected from the tread surface and the tread groove(s), and a light meter adapted to compensate for ambient light conditions at the tread surface, wherein the sensing unit is configured to measure the time-of-flight of the reflected signals, wherein the time-of-flight is used to take a measurement of or derive the depth of the tread groove(s) in the tread surface.

2. The system according to claim 1, wherein the system is adapted for continuing and/or programmed measurement.

3. The system according to claim 2, wherein the signal injector comprises a laser injecting visible light, infra-red or ultra-violet light.

4. The system according to claim 3, wherein the receiver comprises a photocell sensitive to the laser light.

5. The system according to claim 1, wherein the distance is an arbitrary distance from the tread surface.

6. The system according to claim 1, wherein the sensing unit is contained in a hand held unit, and communicates with a smartphone app, or software built into a vehicle's management system.

7. The system according to claim 6, wherein the smartphone app or the software give directions for periodical tyre inspection and step a user through an inspection procedure.

8. The system according to claim 6, wherein, through the smartphone app, or through the management system software and on-board communication system, the sensing unit communicates via the internet or a cellular network with a tyre management or fleet management operation, an insurance company or a tyre parameter monitoring operation.

9. The system according to claim 1, wherein the sensing unit comprises a digital camera.

10. The system according to claim 1, further comprising a tyre identification assigned to the tyre.

11. The system according to claim 10, wherein the tyre identification comprises an RFID chip adhered to the inner wall of the tyre beneath the treat and an RFID reader positioned to read the chip.

12. The system according to claim 1, further comprising a tyre pressure monitoring facility.

13. The system according to claim 12, wherein the tyre pressure monitoring facility comprises a pressure transducer with an RFID-style aerial through which the transducer is powered as it passes by an RFID-type reader.

14. A tyre condition monitoring system comprising a sensing unit adapted for use with a tyre and placed a distance from a tread surface of the tyre to take a measurement of, or at least from which can be derived, depth of tread grooves(s) in the tread surface, the sensing unit being adapted for deployment by non-automated manual or mechanical placement at the distance from the tyre and to store and/or transmit measurement data from one or more of a set of tyres on a vehicle, wherein the sensing unit comprises a signal injector that emits signals to the tread surface and into the tread groove(s), a reflected signal receiver for receiving reflected signals resulting from the signals being reflected from the tread surface and the tread groove(s), and a light meter adapted to compensate for ambient light conditions at the tread surface, wherein the sensing unit is adapted to be traversed across the width of the tread surface of the tyre to generate a profile from which the depth of each of the tread groove(s) can be derived.

15. The system according to claim 14, wherein scanning is automatically started when the sensing unit encounters one edge of the tyre and automatically stopped when the sensing unit encounters the other edge of the tyre.

16. The system according to claim 15, wherein the sensing unit encounters a tyre edge by a proximity switch or a mechanical switch actuated by a skid or a roller.

17. The system according to claim 14, further comprising a robot arm for traversing the sensing unit across the tread surface of the a tyre.

18. The system according to claim 17, for a multi-wheeled vehicle, wherein there is one robot arm and sensing unit for each wheel.

19. The system according to claim 14, wherein the sensing unit is configured to measure the time-of-flight of the reflected signals, wherein the time-of-flight is used to take a measurement of or derive the depth of the tread groove(s) in the tread surface.

* * * * *